United States Patent [19]
Ellis et al.
[11] 4,388,370
[45] Jun. 14, 1983

[54] ELECTRICALLY-CONDUCTIVE FIBRES

[75] Inventors: Vincent S. Ellis; Kazimierz W. Mieszkis, both of Pontypool, England

[73] Assignee: Imperial Chemical Industries Limited, London, England

[21] Appl. No.: 607,949

[22] Filed: Aug. 26, 1975

Related U.S. Application Data

[60] Division of Ser. No. 351,612, Apr. 16, 1973, abandoned, which is a continuation-in-part of Ser. No. 297,392, Oct. 13, 1972, abandoned.

[30] Foreign Application Priority Data

Oct. 18, 1971 [GB] United Kingdom ............... 48362/71
Feb. 3, 1972 [GB] United Kingdom ................. 5107/72

[51] Int. Cl.[3] .......................... B32B 9/00; D02G 3/00
[52] U.S. Cl. .................................... 428/368; 427/121; 427/122; 427/180; 428/244; 428/370; 428/372; 428/373; 428/374; 428/389
[58] Field of Search ............... 428/368, 372, 373, 374, 428/375, 384, 389, 379, 370, 381, 244, 367; 427/122, 121, 180

[56] References Cited

U.S. PATENT DOCUMENTS

| | | | |
|---|---|---|---|
| 2,476,282 | 7/1949 | Castellan | 428/296 |
| 3,399,070 | 8/1968 | Scharf | 427/305 |
| 3,589,956 | 6/1971 | Kranz et al. | 156/62.4 |
| 3,639,195 | 2/1972 | Sanders | 156/62.2 |
| 3,669,736 | 6/1972 | Fujiwara | 428/372 |
| 3,823,035 | 7/1974 | Sanders | 428/372 |
| 3,998,988 | 12/1976 | Shimomai et al. . | |
| 4,061,827 | 12/1977 | Gould | 428/373 X |

*Primary Examiner*—Lorraine T. Kendell
*Attorney, Agent, or Firm*—Cushman, Darby & Cushman

[57] ABSTRACT

Finely divided, electrically-conductive particles are penetrated into an annular region located at the periphery of the sheath component of a drawn melt-spun sheath/core bicomponent fibre. The electrically conductive particles are present in an amount sufficient to render the fibre with an electrical resistance of less than $5 \times 10^9$ ohms/cm. The fibre exhibits durable anti-static properties.

4 Claims, No Drawings

ELECTRICALLY-CONDUCTIVE FIBRES

This is a division of application Ser. No. 351,612 filed Apr. 16, 1973 (now abandoned) which is a continuation-in-part of application Ser. No. 297,392 filed Oct. 13, 1972 (now abandoned).

The present invention relates to electrically-conductive fibres and to methods for their manufacture. The fibres of the invention have antistatic properties which are very resistant towards washing, scouring, dry-cleaning, abrading and other processes to which the fibres may be subjected.

THE PRIOR ART

UK Pat. No. 1 209 635 is concerned with the colouring of non-woven fibrous webs by the application thereto of coloured pigment particles. The webs may comprise bicomponent fibres, of which one component has a lower softening point than the other component and serves as a binder component to bond fibres in the web together. In addition to this bonding activity, the lower softening component also serves to anchor the coloured pigment particles to the bonded fibres. The disclosure is specifically concerned with coloured, bonded, non-woven webs for use in fashion outlets, particularly in relation to so-called "semi-disposable" garments.

U.S. Pat. No. 2 473 183 discloses an electrically-conductive fabric wherein a yarn is used which is coated and/or impregnated with an electrically-conductive composition comprising a vinyl resin, a plasticiser therefor, and carbon black.

U.S. Pat. No. 3 399 070 discloses the production of a flecked metallised yarn by making a 3-layer laminate, of which the outside layers are thermoplastics material, and randomly dispersing flecks of coloured or metallic material onto the outside layers which are thereafter softened. Finally, the laminate is slit to form "yarns". There is no suggestion or teaching that the novelty "yarn" products are electrically-conductive.

U.S. Pat. No. 3 586 597 describes a knitted or woven cloth having antistatic properties made from electrically-conductive fibres. Each fibre consists of a monofilament substrate to which has been applied subsequently a coating consisting of a binder polymer matrix having finely divided, carbon black uniformly dispersed therein. The main disadvantage of this type of fibre is that the adhesion between the coating and the substrate is vulnerable, and in processing or wear the coating may break away from the substrate thereby impairing the effectiveness of the fibre.

THE INVENTION

The present invention provides a drawn (i.e. molecularly oriented), electrically-conductive fibre of substantially circular cross-section, comprising a fiber substrate formed from two polymeric components melt-spun in an integral sheath/core configuration, the sheath component having a lower softening temperature than the core component, and finely divided electrically-conductive particles penetrating into the sheath component so as to form a phase independent of the polymeric material of the sheath component in an annular region located at the periphery of the sheath component, the electrically conductive particles being present in an amount sufficient to render the fibre with an electrical resistance of less than $5\times10^9$ ohms per om.

The term "fibre" as used herein includes continuous filament and staple fibre. The fibre may be a constituent of a multifilament yarn, a knitted or woven fabric or a bonded or unbonded non-woven fibrous web or assembly.

Examples of suitable bicomponent fibres are poly(epsilon caprolactam)/poly(hexamethylene adipamide) fibres, poly(epsilon caprolactam-hexamethylene adipamide)/poly(hexamethylene adipamide), poly(ethylene terephthalate-ethylene adipate)/poly(ethylene terephthalate), poly(ethylene terephthalate-ethylene isophthalate)/poly(ethylene terephthalate) fibres, the first mentioned component being the lower softening component. It is preferred that the lower softening temperature component has a melting point of at least 30° C., preferably at least 40° C., below that of the other component. The fibres of use in the present invention may contain known additives such as dyestuffs, pigments or antioxidants.

The ratio of sheath to core is not critical but it is preferred that the sheath be relatively thin in order that the mechanical properties of the fibre be similar to those of a fibre composed entirely of the core component.

It is preferred that at least some of the particles of conductive material are penetrated into the outer surface layer to a depth of at least 0.3 microns. It is also preferred that the particles are penetrated to a depth not greater than 4 microns.

A process for making a drawn electrically-conductive fibre according to the invention comprises applying to a drawn fibre substrate formed from two polymeric components melt-spun in an integral sheath/core configuration, the sheath component having a lower softening temperature than the core component, finely divided electrically-conductive particles in an amount sufficient to render the fibre with an electrical resistance of less than $5\times10^9$ ohms per cm, at a temperature above the softening temperature of the sheath component but below the softening temperature of the core component, and cooling the fibre substrate when the desired degree of penetration has taken place in the annular region located at the periphery of the sheath component.

In a preferred embodiment of this process, the fibre is subjected to further heating at a temperature below the softening temperature of the core component.

The particles of conductive material may be, for example, conductive carbon black or finely divided metal powder such as silver or gold. In the case of metal powder, an inert atmosphere may be employed in the process to prevent oxidation.

The particles of conductive material are preferably of average diameter less than 5 microns, more preferably less than 1 micron.

In the most preferred case, the particles are one micron or less and penetrate the periphery of the sheath component to a depth of greater than one micron to less than 4 microns.

It is preferred that the particles of conductive material are present in the outer surface layer, i.e. the annular region, of the sheath component of the fibre in an amount such as to occupy a volume of at least 0.03 mls per square meter of the periphery of the sheath component of the fibre.

The particles of conductive material may be applied to the fibre from a bath, from a fluidised bed, as a gas cloud, by electrostatic deposition or as a dispersion in a liquid. In the latter case the liquid may contain or comprise a plasticising agent for the outer surface layer of the fibre.

In the case of application of the conductive material to a multifilament yarn, it is preferred that the yarn should have low or zero twist and that the individual filaments be kept separate during the treatment or that each filament be coated with the particles of the conductive material before softening the surface layers of the filaments in order to prevent the filaments fusing to one another.

The conductive fibres of the present invention in the form of monofilaments and multifilament yarns are particularly useful for imparting antistatic effects to fabric and carpet constructions where good durability of the antistatic effect is important. Useful antistatic weft-knitted fabrics may be produced by feeding the conductive fibres to the dial needles only of a weft-knitting machine. The conductive fibres may be combined with conventional textile fibres using any known means. For certain applications it is preferred that the conductive fibre be crimped. The conductive fibres may be crimped by any known crimping technique such as, for example, edge crimping or a knit-de-knit operation. Potentially self-crimpable fibres, in which the components are disposed in an eccentric sheath-core relationship, are also useful in the present invention. The conductive fibres of the present invention in the form of fabrics or non-woven fibrous webs or assemblies are useful for the production of heating elements, printed circuits, and antistatic hoses, carpet backings and linings.

EXAMPLES

The following examples, in which all parts and percentages are by weight, illustrate but do not limit the present invention.

EXAMPLE 1

A drawn 22 dtex sheath-core monofilament was made having a core derived from poly(hexamethylene adipamide) and a sheath derived from a copolyamide containing 70% of hexamethylene adipamide units and 30% of caprolactam units. The copolyamide of the sheath had a softening temperature of 190° C. The weight ratio of sheath:core was 1:1.

The sheath-core monofilament was coated in a continuous process with a conductive oil furnace carbon black, Vulcan PF (manufactured by Cabot Carbon Ltd), of average particle diameter 0.02 microns. Coating was carried out by guiding the monofilament, running at 150 ft/min, into and through a bath of the carbon black maintained at 210° C. In order to achieve continuous application of the carbon black to the monofilament, a pigtail guide, through which the monofilament passed, was located in the carbon black and reciprocated at 3 cycles/second in a plane transverse to the direction of travel of the monofilament. After washing off loosely adhered carbon black and drying, the monofilament had an electrical resistance of $5\times10^6$ ohms/cm. Optical photographs of cross-sectional segments of the monofilament showed that the carbon black had penetrated into the sheath component to a depth of approximately 2 microns.

EXAMPLE 2

Example 1 was repeated except that the drawn monofilament was of 11 dtex and had a core derived from poly/ethylene terephthalate) and a sheath derived from a copolyester containing 80% of ethylene terephthalate units and 20% of ethylene isophthalate units. The copolyester of the sheath had a softening temperature peak of 205° C. as determined by differential scanning calorimetry. The conductive monofilament so produced had an electrical resistance of $10^7$ ohms/cm after washing off loosely adhered carbon black.

EXAMPLE 3

A drawn sheath-core monofilament as in Example 1 was passed at 100 ft/min over a horizontal hot-plate at 210° C. on top of which carbon black, as in Example 1, was located by means of side walls on the hot-plate. The running monofilament was horizontally traversed at 4 cycles/second. After leaving the hot-plate, the monofilament was immediately passed over a 30.5 cm long hot-plate maintained at 215° C. The effects of passing the monofilament over the second hot-plate were (i) to cause carbon black, loosely adhered to the monofilament, to penetrate into the surface layers of the sheath thus removing the necessity for a washing-off treatment, (ii) to decrease the electrical resistance of the monofilament and (iii) to increase the abrasion resistance of the conductive properties of the monofilament. The monofilament so produced had an electrical resistance of $10^6$ ohms/cm.

After 3,000 rubs in a Martindale abrader, in the form of a knitted fabric, the monofilament had an electrical resistance of $2\times10^6$ ohms/cm. The Martindale abrader was of the standard design as described in J Test Inst 1942, 33, T151.

When an as-spun, i.e. undrawn, sheath-core monofilament was coated with carbon black in a similar manner and then subjected to drawing at a draw ratio over 2.0:1, the resultant monofilament had an electrical resistance of $10^{14}$ ohms/cm.

EXAMPLE 4

A drawn 22 dtex sheath-core monofilament was made having a core derived from poly/hexamethylene adipamide) and a sheath derived from a copolyamide containing 75% of hexamethylene adipamide units and 25% of caprolactom units. The weight ratio of sheath:core was 1:1.

The sheath-core monofilament was coated in a continuous process with a conductive oil furnace carbon black, Vulcan XC72R (manufactured by Cabot Carbon Ltd), of average particle diameter 0.03 microns. Coating was carried out as in Example 3 except that the temperature of the first and second hot-plates were 215° C. and 220° C. respectively. The monofilament so produced had an electrical resistance of $10^6$ ohms/cm.

EXAMPLE 5

A drawn 22 dtex sheath-core monofilament as in Example 1 was treated with a conductive oil furnace carbon black, Vulcan XC72R, in a 3 ft long fluidised bed. The fluidised bed had a porous base through which air at 210° C. was blown into the carbon black. The monofilament was passed through the fluidised bed at 500 ft/min then over a 3 ft long hot-plate maintained at 215° C. The resultant conductive monofilament had an electrical resistance of $2\times10^6$ ohms/cm.

EXAMPLE 6

An 80 decitex drawn yarn was made consisting of 10 sheath-core filaments each of which had a core derived from poly/ethylene terephthalate) and a sheath derived from a copolyester containing 80% by weight of ethylene terephthalate units and 20% by weight of ethylene isophthalate units. The copolyester of the sheath had a softening temperature peak of 205° C. as determined by differential scanning calorimetry. The weight ratio of sheath:core was 1:2.

The drawn yarn was passed at 300 ft/min through a bath of the carbon black used in Example 4 at 120° C., the base of the bath being vibrated so as to keep the carbon black in motion. From this bath the yarn was passed over a hot-plate at 200° C., the filaments being maintained separate. After thorough washing and drying, the treated yarn had an electrical resistance of $2\times10^6$ ohms/cm and the individual filaments, which were not adhered, had electrical resistance of $4\times10^7$ ohms/cm.

EXAMPLE 7

A silver dispersion in methyl isobutyl ketone (Acheson dag dispersion 915) of particle size 1–2 microns was applied to a 29 dtex drawn monofilament, having a nylon 6.6 core and 75/25 nylon 6.6/6 sheath in the ratio of 1:1 weight by means of a cotton wool pad. The coated fibre was then passed over a 6" hot-plate at 220° C. and wound up at 150 ft/min. The resistance of the fibre was variable and in the range $10^3$ to $10^6$ ohms/cm after washing.

EXAMPLE 8

A 6" square of 1,000 dtex lock weave poly(ethylene terephthalate) fabric was dipped into an aqueous dispersion containing 10% by weight of the carbon black as used in Example 4, 1% by weight of a naphthalene sulphonic acid condensate and 20% by weight of an ethylene oxide condensate of octyl cresol.

It was allowed to drip, and dry in the atmosphere for 2 hours. Afterwards it was placed in an oven at 260° C. for 5 minutes. Little carbon black could be washed from the sample, which had a resistance of 2,000 ohms/sq.

EXAMPLE 9

A 6" square of weft knitted 80 dtex 20 filament nylon 6.6 fabric was treated as in Example 8. The impregnated sample had a resistance of 1,500 ohms/sq.

What we claim is:

1. A drawn electrically-conductive fibre of substantially circular cross-section, comprising a fibre substrate formed from two polymeric components in an integral sheath/core configuration, the sheath component having a lower softening temperature than the core component, and finely divided electrically-conductive particles penetrating into the sheath component so as to form a phase independent of the polymeric material of the sheath component in an annular region located at the periphery of the sheath component, the electrically-conductive particles being present in an amount sufficient to render the fibre antistatic.

2. A fibre according to claim 1, wherein the electrically-conductive particles are particles of carbon black.

3. A process for making a drawn, electrically-conductive fibre according to claim 1, which comprises applying to a drawn fibre substrate formed from two polymeric components in an integral sheath/core configuration, the sheath component having a lower softening temperature than the core component, finely divided electrically-conductive particles in an amount sufficient to render the fibre antistatic, at a temperature above the softening temperature of the sheath component but below the softening temperature of the core component, and cooling the fibre substrate when the desired degree of penetration has taken place in the annular region located at the periphery of the sheath component.

4. A process according to claim 3, wherein the electrically-conductive fibre is subjected to a further heating at a temperature below the softening temperature of the core component.

* * * * *